United States Patent
Oien et al.

[11] Patent Number: 6,152,025
[45] Date of Patent: Nov. 28, 2000

[54] FAT COLLECTION STRUCTURE AND METHOD

[76] Inventors: Hal J. Oien, 1315 NW. 185th Ave., Suite 192, Beaverton, Oreg. 97006; Robert L. Larson, 260 Country Club Rd., Suite 220, Eugene, Oreg. 97401

[21] Appl. No.: 09/333,718

[22] Filed: Jun. 15, 1999

Related U.S. Application Data

[60] Provisional application No. 60/089,332, Jun. 15, 1998.

[51] Int. Cl.$^7$ ................ A23L 1/00; A47J 27/00; A47J 43/28
[52] U.S. Cl. ................ 99/495; 99/496; 99/456; 210/484; 210/680; 210/924
[58] Field of Search ............ 99/495, 496, 456; 141/331, 340, 375, 98, 363, 364; 210/505, 508, 513, 484, 487, 502.1, 514, 671, 680, 924, 537, 693; 428/224, 286–288, 297, 299, 76, 71, 308.4, 126, 137, 195; 426/417

[56] References Cited

U.S. PATENT DOCUMENTS

| | | |
|---|---|---|
| Re. 31,087 | 11/1982 | Sohl . |
| 3,764,527 | 10/1973 | Sohl . |
| 4,389,926 | 6/1983 | Joyner ........................ 99/495 |
| 4,587,154 | 5/1986 | Hotchkiss et al. . |
| 4,818,594 | 4/1989 | Albien et al. . |
| 4,832,852 | 5/1989 | Wells et al. . |
| 4,851,273 | 7/1989 | Brown, Jr. . |
| 4,873,101 | 10/1989 | Larson et al. . |
| 4,934,420 | 6/1990 | Radna ........................ 141/340 |
| 4,942,811 | 7/1990 | Kuhn ........................ 99/495 |
| 5,090,306 | 2/1992 | Gresch ........................ 99/510 |
| 5,097,756 | 3/1992 | Nolte ........................ 99/495 |
| 5,247,878 | 9/1993 | Anderson ........................ 99/495 |
| 5,281,463 | 1/1994 | Cotton . |
| 5,320,031 | 6/1994 | Whitney ........................ 99/495 |
| 5,407,575 | 4/1995 | Vinsonhaler . |
| 5,419,250 | 5/1995 | Ferguson ........................ 99/495 |
| 5,526,737 | 6/1996 | Betzen ........................ 99/496 X |
| 5,622,101 | 4/1997 | Margolis ........................ 99/495 X |
| 5,744,406 | 4/1998 | Novak . |

*Primary Examiner*—Timothy F. Simone
*Attorney, Agent, or Firm*—Kolisch Hartwell Dickinson McCormack & Heuser

[57] ABSTRACT

A structure and method is provided for absorbing excess fat from an environment including one or more fats insolubly combined in an aqueous solution mix. The structure includes a plurality of layers, at least one of which is formed from a preferentially fat-permeable, oleophilic material having a greater affinity for fat than for the aqueous solution. Preferably, the structure includes particular structural and topographic components that effectively enhance the inherent fat-affinity of the oleophilic material. The absorption structure is easily employed by introducing it into an environment such as a soup, broth, etc., having fat residing in an aqueous solution. The structure acts to attract and absorb at least a portion of the fat which can then be extracted from the solution. A process for forming the multi-layer absorption structure is also provided.

22 Claims, 3 Drawing Sheets

FAT COLLECTION STRUCTURE AND METHOD

CROSS REFERENCE TO RELATED APPLICATIONS

This application claims priority from Provisional Application Ser. No. 60/089,332 filed on Jun. 15, 1998.

BACKGROUND AND SUMMARY OF THE INVENTION

The present invention relates to a novel structure adapted for use in a variety of cooking environments wherein the invented structure may be employed during the ordinary course of food preparation to attract, collect, absorb, and extract fats and oils present in an aqueous solution mix such as soup, broth, stew, gravy, etc. Specifically, the invention provides a multi-layer absorption structure including a plurality of fat-permeable, oleophilic membranes adapted to preferentially absorb fats and oils from the aqueous solution mix. Further, as will be described in more detail below, these oleophilic membranes are specifically configured to optimize the inherent "fat-affinity" of the membrane material.

As used herein, the term fat, fats, or fatty substance is generic and all-inclusive of the myriad water insoluble substances naturally present in plants and animals and variously referred to by molecular chemists, nutritionists, etc., as fats, oils, lipids, and/or triglycerides. In general, fats and oils are distinguished by their melting points in that fats are solid at room temperature while oils are liquid at room temperature. However, since fats as wells as oils are typically in a liquid state at the elevated temperatures associated with most cooking operations, this distinction can become blurred. Thus, it will be understood that reference herein to fat, fats, or fatty substances is not limited to a particular substance or physical state, but includes all such substances just mentioned regardless of source or physical state.

It is now widely accepted among the medical community, nutritionists, and the general public that excess fat in the diet can lead to a variety of health problems including high blood pressure, heart disease, cancer, etc. Indeed both public and private entities have established guidelines specifying maximum daily amounts of fat in a recommended healthy diet. In response to consumer concerns over food products having a high fat content, both restaurants and food manufacturers have offered alternatives labeled "low-fat," "reduced fat," "fat-free," etc. In addition, non-digestible fat substitutes have been developed to replace the conventional fat in food products. However, neither of these approaches adequately address one of the most common sources of fat in an average diet: fat from foods prepared in the home.

Most people who engage in even a modest amount of cooking in the home are familiar with the sight of films or globules of liquefied fat suspended or floating in soups, broth, stews, etc. Although liquefied fat is insoluble in water, and thus forms generally unblended, unhomogenized, structurally differentiated films or globules when mixed with water, its liquid state nevertheless makes it difficult to separate and remove from a soup, broth, or other aqueous cooking solution. Attempts to remove the fat by decanting it will usually result in the loss of an equal or greater amount of the soup, etc. Nevertheless, the obvious presence of this excess fat is a source of great concern for health conscious cooks.

There is, therefore, a substantial and growing demand for a product or method which would help to remove excess fat during preparation of such foods. Preferably, such a product or method would be both inexpensive and easy to use so that even novice cooks could employ the product or method in their home. Furthermore, the product or method should not compromise food safety, affect the taste of the food, or otherwise interfere with the cooking process. Finally, the product or method should be capable of removing fat from aqueous solutions such as soups, stews, broth, etc., without also removing a substantial portion of the food.

To meet this demand, the present invention provides a food-safe material and structure which can be incorporated into the normal cooking process to absorb excess fat from a variety of foods including fat resident in an aqueous solution. In a preferred embodiment of the invention, the structure includes a multi-layer, fat-absorbent pad which can be placed in a sauce pan, crock-pot, etc., along with the food being cooked. The absorbent pad acts to attract and collect excess fat that is produced from the food during cooking, and is specifically structured and textured to maximize the amount of fat that is absorbed. Preferably, the pad includes topographical features and internal pockets which increase the absorptive surface area that would otherwise be available in a pad of a given size. In addition, the pad is preferably constructed of hydrophobic material(s) to reduce, if not eliminate, the absorption or extraction of the desirable liquids from the food.

Various other features, objects and advantages which are attained by the present invention will become more fully apparent as the description which now follows is read in conjunction with the accompanying drawings.

DETAILED DESCRIPTION, AND BEST MODE FOR CARRYING OUT THE INVENTION

Figure 1:
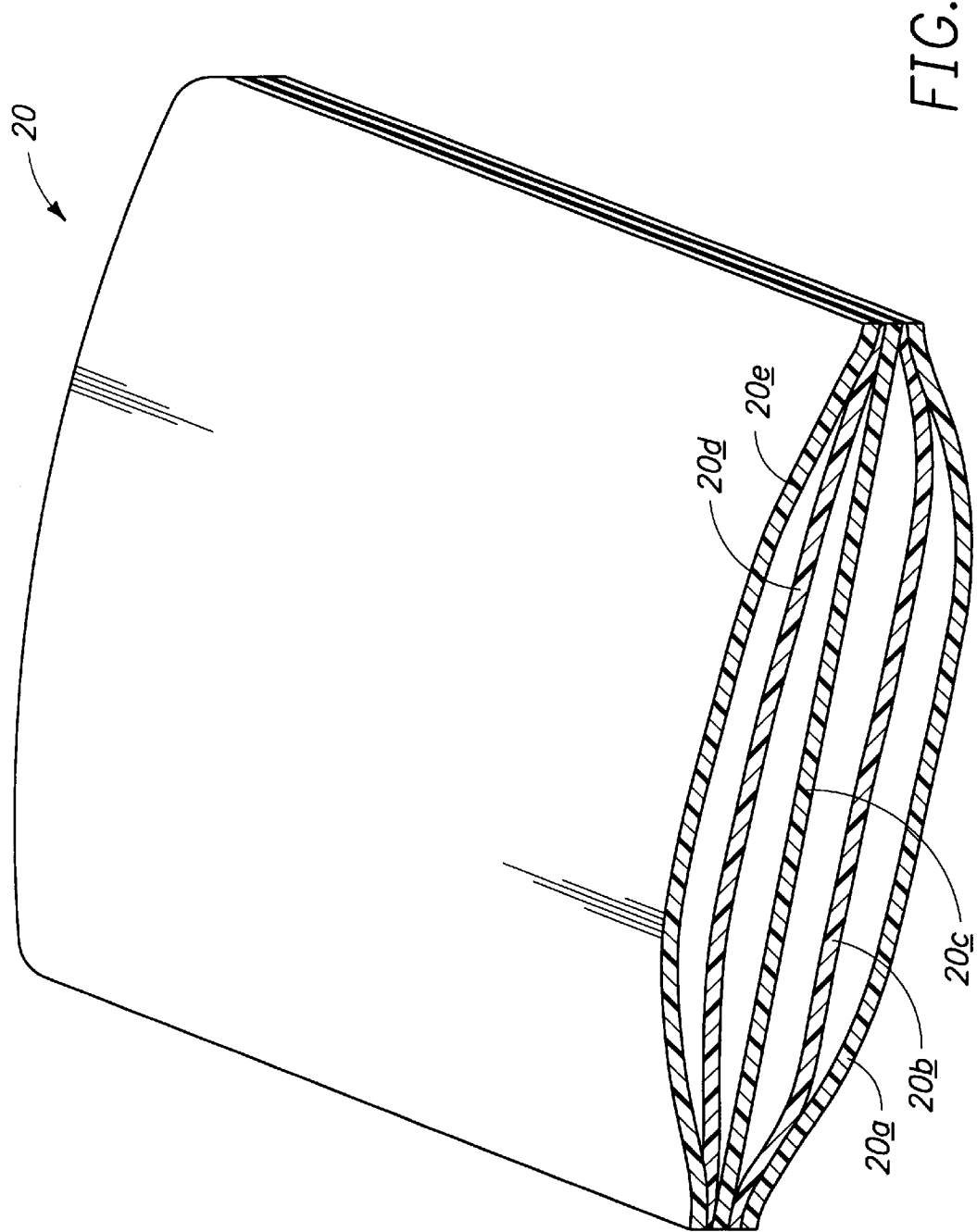
FIG. 1 is an isometric view of a fat-absorption structure according to the present invention, with one edge removed to show the multi-layered construction and the internal pockets. For clarity, the layers are not shown as having topographic characteristics in accordance with one preferred embodiment of the invention.

Turning now to the drawings, and referring first of all to FIG. 1, indicated generally at 20 is one embodiment of a multi-layer, fat-absorption and extraction structure according to the present invention. Structure 20 is specifically configured for use in an environment including one or more fats insolubly combined in an aqueous solution mixture, and is adapted to preferentially absorb the fats from the solution mixture to facilitate the extraction of the absorbed fats therefrom. While several preferred embodiments of structure 20 are described in particular detail below, those of skill in the art will appreciate that various modifications can be made to the size, shape, and configuration of structure 20 as desired for a particular application without exceeding the scope of the present invention. Furthermore, while the invention is described in the context of home food preparation, it will be understood that the invention is easily adaptable for use in commercial, industrial, or other environments where it is desired to accumulate, absorb, separate, and/or extract undissolved fat in water or similar liquids.

As depicted in FIG. 1, structure 20 includes a plurality of layers 22a–e disposed in a generally side-by-side arrangement and joined to form a fat-absorbent pad. At least one, and preferably all, of layers 22a–e are formed of one or more so-called oleophilic materials, i.e., materials having a greater attraction affinity for fat than the non-fat components of an aqueous solution mix. More precisely, these oleophilic materials have the specific property of attracting and accumulating adjacent fats which, upon coming into contact with the oleophilic material, tend to "wet" and cling to the material. Preferably, the material(s) from which the layers are constructed are hydrophobic as well as oleophilic, thus preferentially attracting and absorbing fat over the water component of the aqueous solution mix which tends not to "wet" or cling to the material. In any event, an important aspect of the invention is that this material is further manipulated and configured, as will be described in more detail below, into a structure that enhances its natural fat-affinity.

Layers 22a–e may be formed from any of a wide variety of oleophilic materials as required by the environmental conditions of a particular application. Such environmental conditions may include the temperature or viscosity of the aqueous solution, the configuration of the layers, available methods for joining the layers, or the presence of products within the environment which are intended for human consumption. In the latter case, a number of food-grade materials are available and well known in the art. Three examples of the many materials suitable for use in cooking applications include USP Grade VI polypropylene, polyester, and polyethylene, with polypropylene being typically somewhat more preferable than polyester due to the generally higher fat-affinity of polypropylene relative to polyester.

In a preferred embodiment, one or more of oleophilic layers 22a–e are formed as a membrane that is permeable to fat to allow fat which is adsorbed onto an outer layer 22a, 22e of structure 20, to permeate the outer layer and wet an inner layer such as layers 22b–d. As a result of this fat-permeability, while the embodiment depicted in FIG. 1 includes plural oleophilic layers joined at their peripheries so that inner layers 22b–d are not directly exposed to environment 24, the inner layers are nevertheless effective to attract and accumulate fat from the environment as it permeates through outer layers 22a, 22e. It is this ability to permeate fat through the outer layers of structure 20 which enables the structure to absorb as well as adsorb the fat. Furthermore, where layers 22a–e are both oleophilic and hydrophobic, the layers will preferentially permeate fat over water in aqueous solution 28 as the water will tend not to wet and pass through the membrane layers. Thus, the structure is preferentially fat-absorbing relative to water. While there are several constructions of the oleophilic materials described above that will allow fat to permeate the material, one effective and cost-efficient construction involves fibrous material such as polypropylene, polyester, or polyethylene which is spun-bound to form a fibrous web in relatively thin, flexible sheets.

Figure 2:
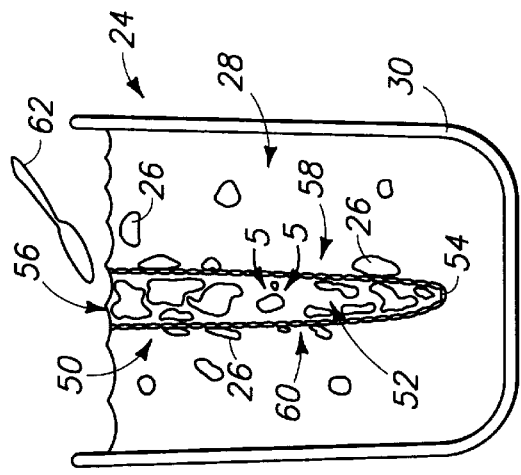
FIG. 2 is a cross-sectional view of the fat-absorption structure of FIG. 1 shown immersed in a typical cooking environment including one or more fats insolubly combined in an aqueous solution mix. The plural central pockets are clearly shown, as are the topographic features adapted to enhance the effective surface area of the fat-pervious layers.
Figure 3:
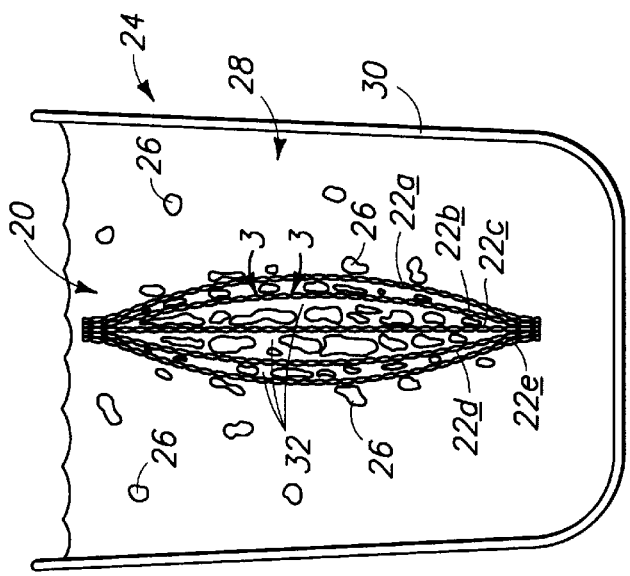
FIG. 3 is an enlarged fragmentary detail, taken generally between the arrows 3—3 in FIG. 2, focussing on the topographic features which are formed into the oleophilic layers to increase the fat-wettable surface of the layers and enhance the attraction affinity of the material for the fats. The fat globules are illustrated as "wetting" the surface of the oleophilic material and permeating through the layer.

Turning attention now to FIGS. 2 and 3, structure 20 is depicted immersed in an environment 24 wherein one or more fats 26 are insolubly combined in an aqueous solution mix 28 held in a container such as container 30. Aqueous solution mix 28 may include any typical cooking liquid such as soup, broth, stew, etc., as well as non-aqueous food products (not shown) including meats, vegetables, etc. Structure 20 may be introduced into environment 24 in any desired orientation and at any desired depth within solution mix 28. In certain situations, and depending on the relative sizes of the structure and the environment, it may be desirable to move the structure within the environment to maximize the absorption of fat. In any event, fat globules 26 wet the outer layers of the structure and then permeate through the structure toward the inner layers.

Although structure 20 may be formed with as few as two layers, one advantage of an embodiment of structure 20 having four or more layers is qualitatively depicted in FIG. 2. Specifically, as the permeated fat passes from the outer layers inward, a concentration gradient is established such that a greater concentration of fat is accumulated adjacent the inner layers than the outer layers. This concentration gradient is due to the natural tendency of the fat to accumulate along the oleophilic material and away from the solution mix. Thus, the fat-absorption capacity is enhanced through the use of four or more layers.

The cross-sectional view of FIG. 2 illustrates one configuration of the oleophilic material which, as mentioned briefly above, enhances the natural fat-affinity of the material. Specifically, layers 22a–e are joined at their periphery to form a plurality of central pockets 32 within structure 20, the number of pockets formed being one less than the number of layers in the structure. As shown in FIG. 2, these pockets are particularly adapted for confining fat between the layers of the structure, thereby increasing the amount of fat which can permeate the outer layers. Indeed, a greater concentration of fat tends to be confined within inner pockets than within outer pockets. When structure 20 is removed from container 30, fat confined within the pockets is extracted from the solution mix, thereby reducing, if not eliminating, excess fat from the food.

It will be appreciated that modifications to the embodiment depicted in FIG. 2 may be made within the scope of the invention. As one example only, the layers may be joined at locations other than, or in addition to, their peripheries to form the pockets with different shapes or sizes. Alternatively, a portion of the peripheries of the layers may be left unjoined so as to form open-side pockets. This latter alternative embodiment being useful, for example, to decant permeated fat from the pockets without removing the absorbing pad from the container.

Those of skill in the art will appreciate that there are a variety of methods for joining the layers, the most appropriate of which will depend on the material(s) being used and specific structural features desired. Sewing, gluing, and heat sealing are just a few of these methods which are well known in the art. Another joining method which has proven particularly suitable for use with polypropylene and/or polyester layers is ultrasonic welding. This method has the advantages of being reliable, inexpensive, foodsafe, and suitable for mass production.

Focusing attention more particularly on the detailed view of FIG. 3, a further configuration or manipulation of the oleophilic material is depicted which, independent of the pockets, enhances the fat-affinity of the material. Specifically, one or more of the layers, such as layer 22a, include topographic characteristics which function to expose an effective surface area that is greater than the nominal surface area of the layer without the topographic characteristics. In other words, as depicted in FIG. 3, layer 22a is topographically featured or textured such that the layer has an effective surface area that is greater than the perimetrical footprint of the layer when arranged in a substantially planar orientation. By increasing the surface area of the layer, the natural fat-affinity of the material is enhanced because there is a greater area upon which the fat can accumulate and wet.

In the embodiment of the invention depicted in FIG. 3, the material of each layer is dimpled, embossed, or otherwise deformed to create alternating ridges 34 and valleys 36 in the surfaces of the layers. In addition to increasing the effective surface area of the layers, these topographic features also increase the "wettable" surfaces exposed to a particular globule of fat. As the fat seeks to wet and cling to the oleophilic material, it tends to flow into valleys 36 where it not only contacts the bottom of the valley, but also contacts the sides of ridges. With increased surface contact, the fat clings more strongly to the layers. It will be appreciated that the oleophilic layers may be topographically textured to include a variety of surface profiles in addition to the generally periodic, sinusoidal profile depicted in FIG. 3. For example, the topographic features may be incorporated into decorations and/or indicia such as trademarks which are visible on the outer layers of the structure. Furthermore, less than all of the layers may include these topographic characteristics, such as only an outer layer or only an inner layer.

As described above, the exemplary embodiment depicted in FIGS. 2 and 3 illustrates the employment of at least two structural components that independently enhance the absorption capability of the oleophilic materials of construction. Specifically, one or more of the oleophilic layers include topographic features which effectively increase the amount of surface area that is available for wetting by the fat, and the layers are joined to form one or more internal pockets which are capable of expanding and storing fat between adjacent layers.

Another way of understanding the invention is also perhaps best illustrated in FIG. 3, wherein layer 22a can be visualized as a separation structure immersible and positionable in the aqueous solution mix, and having a first outwardly directed face or side 38 and a second outwardly directed face or side 40. First side 38, also referred to herein as an exterior exposure surface, faces toward the solution environment while second side 40 faces away from the solution environment. Due to its preferably oleophilic/hydrophobic character, first side 38 is adapted to preferentially collect fat from an adjacent volume of the aqueous solution for permeation through the layer and absorption into the structure. In other words, first face 38 presents what can be thought of as an "invitation" to the permeation of a fatty substance while simultaneously presenting a barrier to the permeation of a non-fatty substance. Furthermore, second side 40 then effectively presents a barrier to the reverse permeation of the fatty substance back into the aqueous solution. Thus, the layer acts to separate at least a portion of the fatty substance from the non-fatty substance and to confine the fatty substance adjacent that face of the layer opposite the aqueous solution.

Figure 4:
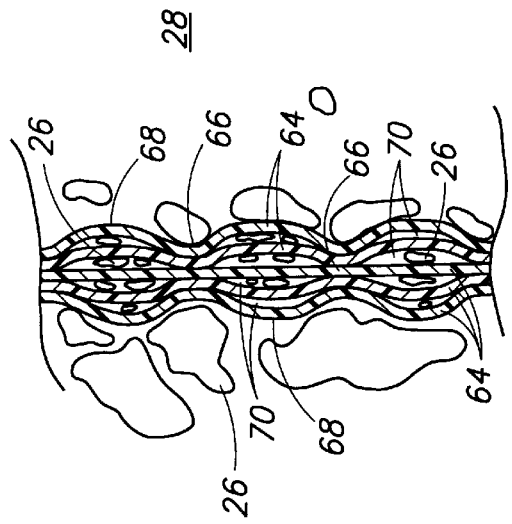
FIG. 4 is a view similar to FIG. 2, showing an alternative embodiment of the fat-absorption structure wherein a plurality of layers are joined at multiple discrete sites and then the joined layers are folded to form pad with a central, open-sided pocket to allow absorbed and permeated fat to be decanted from the aqueous solution.
Figure 5:
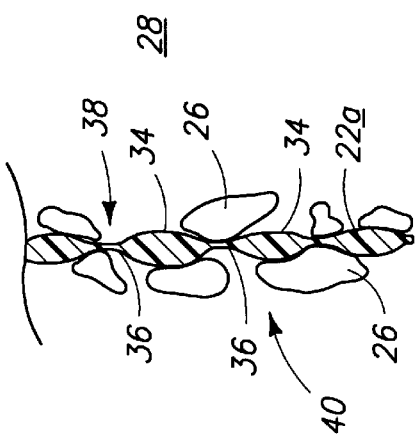
FIG. 5 is an enlarged fragmentary detail, taken generally between the arrows 5—5 in FIG. 4, focussing on the topographic features which are formed when the oleophilic layers are joined at multiple discrete sites across the layers. In addition, the plurality of internal pockets formed between the discrete sites are shown confining some of the fat which has been absorbed by the absorption structure. Similar to FIG. 3, the fat globules are illustrated as "wetting" the surface of the oleophilic material and permeating through the layer.

Turning attention now to FIGS. 4 and 5, an alternative absorption structure, indicated generally at 50, is depicted in an identical environment 24 as that shown in FIG. 2. As is apparent from FIG. 4, structure 50 differs from structure 20 in that structure 50 includes a single central pocket 52 formed by folding the oleophilic material against itself. In the embodiment depicted in FIG. 4, structure 50 is joined, such as by one or more of those methods described above, along two peripheral edges adjacent fold 54. A third peripheral edge 56 opposite fold 54 is left open to form an open-sided central pocket 52. In this embodiment, structure 50 may be formed from a material which, when folded as shown, has a natural tendency to return or relax to a substantially straight, unfolded state. In which case, fold 54 acts as a living hinge to urge the opposing walls 58, 60 apart thereby opening edge 56. In the event that structure 50 is oriented in environment 24 such that open-sided pocket 52 opens in a generally upward direction, then the permeated fat which is confined within the pocket may easily be extracted from the solution by decanting the fat from pocket 52 with a spoon 62 or other implement.

In an alternative embodiment of structure 50, all three peripheral edges (adjacent and opposite fold 54) could be joined to form a closed pocket. As a further alternative, only edge 56 could be joined, thus forming an open tube-like structure. Finally, a support member may be positioned to extend between walls 58 and 60 to maintain open-sided pocket 52 in an open configuration.

While structure 50 may be arranged into a multi-layer absorption pad by folding a single layer of oleophilic material, in a preferred embodiment of structure 50 illustrated in the detail view of FIG. 5, a plurality of layers 64 are joined at multiple discrete sites 66 distributed across the layers to form a single multi-layer sheet or strip which is then folded as shown in FIG. 4 to form structure 50. In addition, to providing a physical coupling between the plural layers, sites 66 also function to enhance the inherent fat-affinity of the material. Specifically, sites 66 form valleys where the layers are locally compressed, thereby leaving ridges 68 of uncompressed, layered material between the sites. In one preferred embodiment, layers 64 are joined by ultrasonic welding which forms the valleys at the weld point. Thus, the process of joining the layers also topographically textures the layers to increase the effective surface area of the material, thus exposing greater wettable surface to fat 26. Furthermore, as discussed above, the alternating ridges and valleys encourage the fat to wet and flow toward the valleys where the fat is able to achieve contact with the bottom of the valleys as well as the sides of the ridges.

In addition to the topographical features formed in the layers during joining, a plurality of relatively small, internal pockets 70 are also formed between the sites. As with the relatively large central pocket 52, pockets 70 act to store and confine permeated fat between layers 64. It will be appreciated that sites 66 may be formed in any desired pattern or density across layers 64, thereby varying the shapes and sizes of pockets 70. In any event, by combining a topographically featured layer structure with a plurality of internal pockets, the fat absorption capability of structure 50 is enhanced beyond the inherent attraction affinity of the material(s) from which the layers are formed.

As with structure 20, the plural layers of structure 50 may be formed from any of a variety of materials described above. One construction that has been found to be particularly suitable includes the use of both polypropylene and polyester. Specifically, in the five layer embodiment depicted in FIG. 5, the two left-most layers are formed of a spun-bound, fibrous polyester web, while the three right-most layers are formed of a spun-bound, fibrous polypropylene web. Although having somewhat less fat-affinity than polypropylene, the polyester material, when combined with the polypropylene material, provides improved mechanical characteristics to the structure. Thus, in FIG. 4, the inwardly projecting faces of sides 58 and 60 are depicted as formed of polyester while the outwardly projecting exposure faces of sides 58 and 60 are formed of polypropylene. It will be appreciated that while this configuration takes advantage of the superior mechanical properties of polyester, once the layers are folded to form the absorption pad, the polyester layers are disposed between the polypropylene layers, thus, exposing the material with the greatest fat-affinity to the aqueous solution mix. Furthermore, this structure also ensures that a plurality of pockets 70 are formed between layers of the same material, i.e., polypropylene/polypropylene and polyester/polyester, while a further plurality of pockets are formed between layers of different materials, i.e., polypropylene/polyester.

Figure 6:
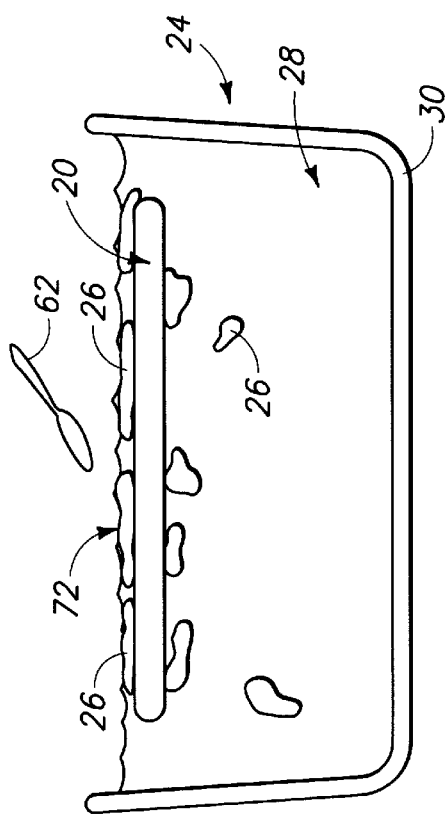
FIG. 6 illustrates a technique for positioning the absorption structure adjacent the upper surface of an aqueous cooking solution so that fat is absorbed through the structure and confined near the surface of the solution for easy decanting.

As described above, structure 20 and structure 50 provide a fat-extraction device which enables a cook to remove excess fat from food during the cooking process. By simply introducing the absorption structure into a cooking container holding an aqueous cooking solution, excess fat residing in the aqueous solution is preferentially absorbed into the structure and may easily be extracted from the solution. An alternative technique for extracting excess fat using either structure 20 or structure 50 is illustrated in FIG. 6, wherein the structure is positioned so that one side extends generally along and adjacent the upper surface 72 of solution 28. In this orientation, the structure is effective to absorb fat 26 as described above. Additionally, at least a portion of the absorbed fat permeates entirely through the structure to be confined at surface 72 where it can easily be decanted. Thus, using this technique, structure 20 and structure 50 function to separate at least a portion of the fat insolubly mixed in a cooking solution and deliver the separated fat to a location at the periphery of the solution for decanting.

Figure 8:
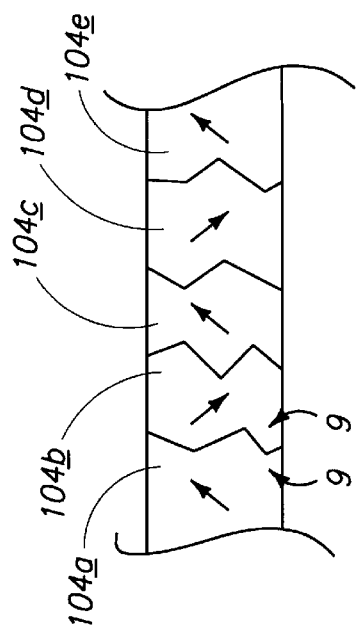
FIG. 8 is a fragmentary, cut-away top plan view of the plural fibrous layers showing the alternating grains. The arrows associated with each layer indicate the general direction in which a substantial majority of the fibers extend.
Figure 9:
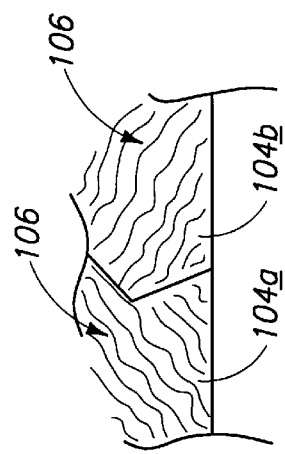
FIG. 9 is an enlarged fragmentary detail, taken generally between the arrows 9—9 in FIG. 8 showing the alternating grains of adjacent layers due to alternating fiber orientations.
Figure 7:
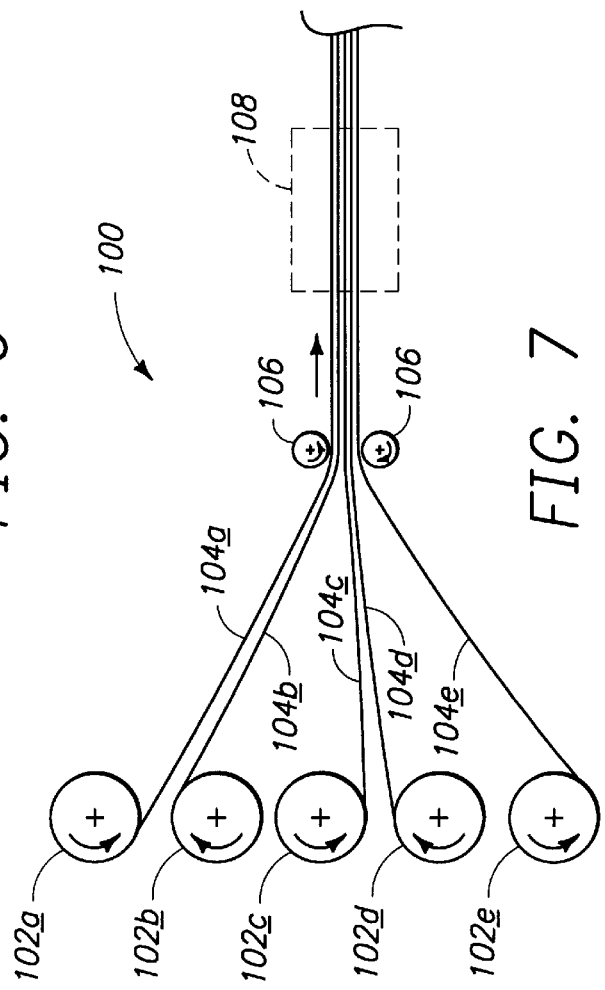
FIG. 7 is a schematic representation of a method for forming the multi-layer absorption structure illustrating the use of identically grained sheets in an alternating orientation to alternate the grain direction of adjacent layers.

Turning attention now to FIGS. 7–9, indicated generally at 100 in the schematic representation of FIG. 7, an exemplary method of forming a multi-layer, fat-absorption structure is depicted. In this embodiment, five rolls 102*a–e* of preferably oleophilic/hydrophobic material, such as spun-bound, fibrous polypropylene webbing are positioned to dispense elongate sheets 104*a–e* of the material along generally parallel paths. Sheets 104*a–e* are then brought together such as by compression feed rollers 106 and arranged into a multi-layer structure. Once arranged into multiple layers, the sheets may undergo additional processing, such as at downstream station 108, including joining, texturing, trimming, etc.

Preferably, sheets 104*a–e* are spun-bound fibrous sheets of an oleophilic/hydrophobic material such as polypropylene, polyester, and/or polyethylene, and are formed with a "grain" so that a substantial majority of the fibers in each sheet extends in a direction generally at a 45 degree angle from the elongate axis of the sheet. Also preferably, alternate rolls are reversed so that, for example, the sheets 104*a, c, e* contain a substantial majority of fibers extending in a generally transverse direction to the direction in which a substantial majority of fibers extend in sheets 104*b, d*. Thus, as shown in the detail views of FIGS. 8 and 9, adjacent sheets have generally transverse grains, thereby by providing increased structural strength and resistance to stretching.

While various features and advances that are offered and proposed by the present invention have thus been described and illustrated herein, it will be appreciated that various changes and modifications may be made which come within the scope of the present invention.

It is desired to claim and secure by Letters Patent:

1. For use in an environment including one or more fats insolubly combined in an aqueous solution mixture, a structure adapted to preferentially absorb the fats from the solution mixture, comprising:

a plurality of mixture-immersible layers disposed in a generally side-by-side arrangement to form a multi-layer absorption structure, including at least one oleophilic layer having a greater attraction affinity for such fats than for such aqueous solution.

2. The structure of claim 1, wherein said absorption structure includes plural oleophilic layers having a greater attraction affinity for such fats than for such aqueous solution.

3. The structure of claim 1, wherein said plurality of layers are joined to form at least one pocket within said absorption structure.

4. The structure of claim 3, wherein said pocket is formed between layers of the same material.

5. The structure of claim 3, wherein said pocket is formed between layers of different materials.

6. The structure of claim 3, wherein said plurality of layers are joined peripherally to form a central pocket within said absorption structure.

7. The structure of claim 3, wherein said plurality of layers are joined at multiple discrete sites distributed across said layers to form multiple pockets between said sites.

8. The structure of claim 3, wherein said plurality of layers are joined by ultrasonic welding.

9. The structure of claim 1, wherein at least one of said plurality of layers is formed of polypropylene.

10. The structure of claim 9, wherein at least one of said plurality of layers is formed of polyester.

11. The structure of claim 10, wherein said at least one polyester layer is disposed between layers formed of polypropylene.

12. The structure of claim 1, wherein each of said plurality of layers, when arranged in a substantially planar orientation, has a perimeter which defines a footprint, and wherein at least one of said plurality of layers is topographically featured such that at least one side of said topographically featured layer has a surface area greater than its footprint.

13. The structure of claim 12, wherein said topographically featured layer is an outer layer of said plurality of layers.

14. The structure of claim 12, wherein said topographically featured layer is an inner layer of said plurality of layers.

15. The structure of claim 12, wherein each of said plurality of layers is topographically featured such that at least one side of each layer has a surface area greater than its footprint.

16. The structure of claim 12, wherein said topographically featured layer is topographically featured, at least in part, by ultrasonic welding.

17. The structure of claim 1, wherein said plurality of layers are formed of a fibrous material having a substantial majority of elongate fibers extending generally in a single direction.

18. The structure of claim 17, wherein said absorption structure includes a first layer oriented such that said substantial majority of said first layer fibers extend in a first direction, and a second layer oriented adjacent said first layer such that said substantial majority of said second layer fibers extend in a second direction generally transverse to said first direction.

19. The structure of claim 18, wherein said first and second layers are formed of spun-bound polypropylene.

20. The structure of claim 18, wherein said first layer is formed of spun-bound polypropylene, and said second layer is formed of spun-bound polyester.

21. A structure usable in an environment including a fatty substance insolubly mixed with a non-fatty substance, comprising a separation structure having first and second outwardly directed faces, wherein said structure is positionable within such environment so that said first face faces toward such environment and said second face faces away from such environment;

wherein said first face presents an invitation to permeation of such fatty substance and a barrier to permeation of such non-fatty substance, and said second face effectively presenting a barrier to the reverse permeation of such fatty substance.

22. The structure of claim 21, wherein such environment is a liquid, and wherein said separation structure is further positionable within such environment so said second face extends adjacent the upper surface of such environment and is effective to separate such fatty component from such non-fatty component for decanting of such fatty component from such environment.

* * * * *